United States Patent
Hans et al.

(10) Patent No.: US 9,351,229 B2
(45) Date of Patent: May 24, 2016

(54) MOVING AD HOC NETWORK SMALL CELL RELAY HANDOVER

(71) Applicant: Intel Corporation, Santa Clara, CA (US)

(72) Inventors: Martin Hans, Bad Salzdetfurth (DE); Andreas Schmidt, Braunschweig (DE); Maik Bienas, Braunschweig (DE); Michael Faerber, Wolfratshausen (DE); Carlos Cordeiro, Portland, OR (US); Huaning Niu, Milpitas, CA (US); Pingping Zong, Randolph, NJ (US); Qian Li, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 75 days.

(21) Appl. No.: 14/135,315

(22) Filed: Dec. 19, 2013

(65) Prior Publication Data

US 2015/0181502 A1 Jun. 25, 2015

(51) Int. Cl.
*H04W 40/22* (2009.01)
*H04W 40/02* (2009.01)
*H04W 36/00* (2009.01)
(Continued)

(52) U.S. Cl.
CPC .......... *H04W 40/22* (2013.01); *H04W 36/0005* (2013.01); *H04W 40/026* (2013.01); *H04W 84/005* (2013.01); *H04W 84/047* (2013.01)

(58) Field of Classification Search
CPC ..... H04W 88/02; H04W 88/04; H04W 88/06; H04W 88/08; H04W 88/10; H04W 36/24; H04W 36/00; H04W 36/32; H04W 36/34; H04W 36/36; H04W 36/38; H04W 36/04; H04W 36/16; H04W 36/165; H04W 36/28; H04W 36/30; H04W 92/02; H04W 84/045; H04W 84/047; H04W 84/105; H04W 84/20; H04W 84/22; H04W 84/005
USPC ........ 455/422.1, 436–444, 450–452.2, 550.1, 455/561; 370/331–333
See application file for complete search history.

(56) References Cited

U.S. PATENT DOCUMENTS

2007/0104148 A1* 5/2007 Kang et al. ..................... 370/331
2009/0088164 A1* 4/2009 Shen et al. ..................... 455/436
(Continued)

FOREIGN PATENT DOCUMENTS

| WO | WO-2013023171 A1 | 2/2013 |
| WO | WO-2013066129 A1 | 5/2013 |
| WO | WO-2015095537 A1 | 6/2015 |

OTHER PUBLICATIONS

"International Application Serial No. PCT/US2014/071189, International Search Report mailed Mar. 3, 2015", 3 pgs.
(Continued)

*Primary Examiner* — George Eng
*Assistant Examiner* — Umair Ahsan
(74) *Attorney, Agent, or Firm* — Schwegman Lundberg & Woessner, P.A.

(57) ABSTRACT

A mobile small station including a transceiver, a processor, and a memory having instructions for execution by the processor to exchange measurement information with a macro station, provide a wide area network connection and act as a relay for a small station moving network with the mobile small station, and perform handover of relay responsibilities to another mobile small station in the small station moving network.

15 Claims, 7 Drawing Sheets

(51) Int. Cl.
*H04W 84/00* (2009.01)
*H04W 84/04* (2009.01)

(56) References Cited

U.S. PATENT DOCUMENTS

| | | | |
|---|---|---|---|
| 2011/0275378 | A1 | 11/2011 | Kwon et al. |
| 2012/0172055 | A1* | 7/2012 | Edge .................... G01S 5/0018 455/456.1 |
| 2012/0294275 | A1* | 11/2012 | Krishnaswamy et al. .... 370/331 |
| 2013/0051309 | A1* | 2/2013 | Van Phan et al. ............. 370/315 |
| 2013/0077494 | A1* | 3/2013 | Samdanis ............. H04B 7/155 370/235 |
| 2013/0143574 | A1* | 6/2013 | Teyeb et al. .................... 455/438 |
| 2014/0073330 | A1* | 3/2014 | Pan et al. ....................... 455/441 |

OTHER PUBLICATIONS

"International Application Serial No. PCT/US2014/071189, Written Opinion mailed Mar. 3, 2015", 5 pgs.

* cited by examiner

MOVING AD HOC NETWORK SMALL CELL RELAY HANDOVER

BACKGROUND

Ad hoc networks have been built between small cell base station devices or end-user devices in which the devices can communicate within the ad hoc network typically using short range communication technology, such as WiFi, BT, WiGig, and general mmWave technology. To communicate outside the ad hoc network, at least one of the participating devices provides wide area network (WAN) connectivity. Such connectivity is usually accomplished via a cellular interface to a macro cell. The WAN connected devices offer their WAN connection to all devices within the ad hoc network. An efficient strategy to select these devices takes into account the device's capabilities, such as the costs in terms of power and spectrum resource consumption, and the benefit in terms of offered bandwidth, latency, and other factors.

DETAILED DESCRIPTION

Figure 1:
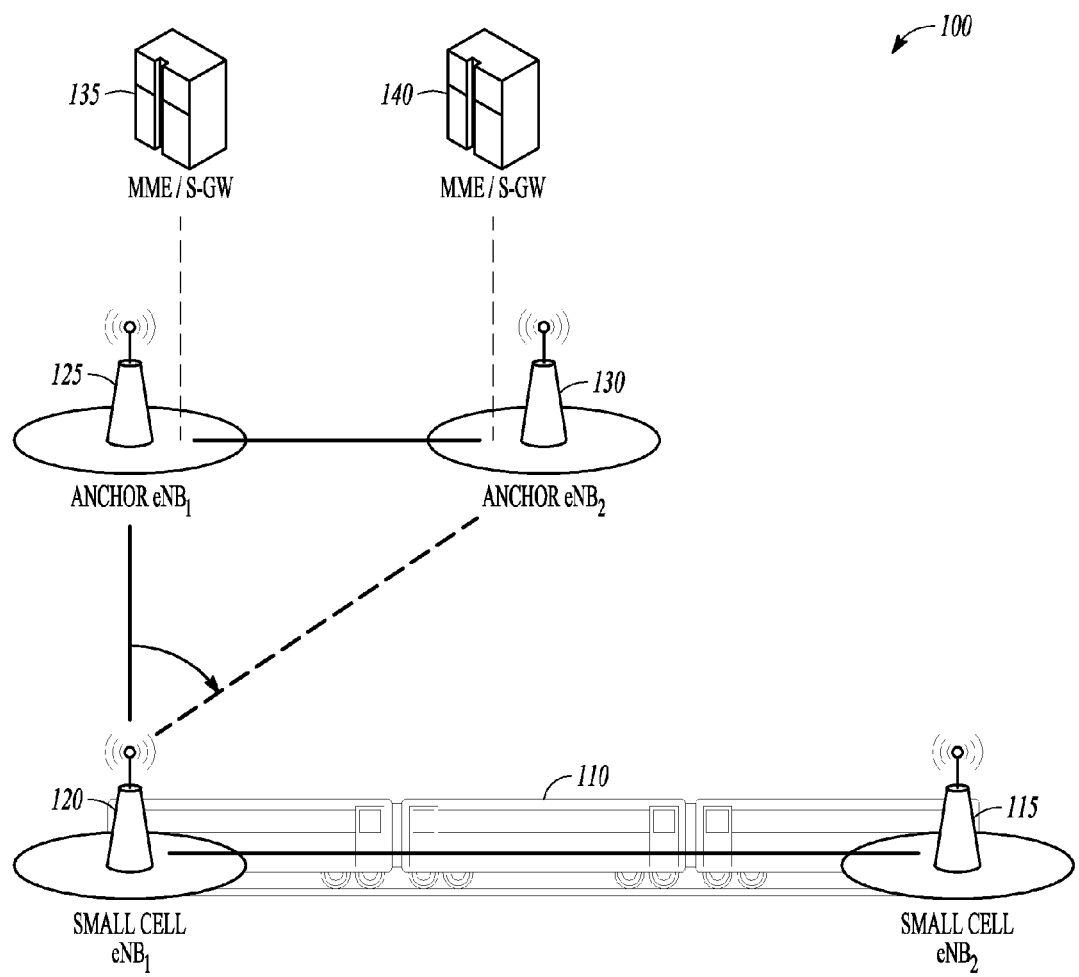
FIG. 1 is a block diagram of a small station moving network according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Moving ad hoc networks may be built between small cell base station devices or end-user devices in which the devices can communicate within the ad hoc network typically using short range communication technology, such as WiFi, BT, WiGig, and general mmWave technology. To communicate outside the ad hoc network, at least one of the participating devices provides wide area network (WAN) connectivity. Such connectivity is usually accomplished via a cellular interface to a stationary macro cell. The WAN connected devices offer their WAN connection to all devices within the ad hoc network, effectively serving as a relay. In various embodiments, a seamless handover of the relay is performed by anticipating and selecting a new relay in the moving network prior to degradation of communications between a current relay and a macro cell.

An efficient strategy to select these devices takes into account the device's capabilities, such as the costs in terms of power and spectrum resource consumption, and the benefit in terms of offered bandwidth, latency, and other factors.

Examples of moving ad hoc networks may include multiple devices on a moving train or in a group of cars moving in the same direction. The train may have several small cell base stations serving mobile devices such as cell phones, tablets, and other networked devices used by riders of the train, as well as other devices on the train. Cars may also have small cell base stations serving the needs of passengers with networked mobile devices.

Various terms may be used and are described. A macro station may be a fixed macro base station offering a wireless backhaul connection to small cell base stations. Air interfaces in use may be cellular, licensed mmWave or unlicensed Short Range or mmWave. A mobile small station may include a mobile small cell base station connected to a core network through the wireless backhaul offered by the macro station, offering relaying of the backhaul link to other mobile small stations and offering access link to user equipment (UEs) in mobile small station coverage via cellular or unlicensed short range or mmWave. In some embodiments, user equipment, such as a cell phone, tablet, or laptop may also have sufficient capabilities to operate as a mobile small station.

A mobile small station network is a network of mobile small stations, either connected wirelessly or wired, in a fixed relation (e.g. in-train) or dynamically connected and disconnected (e.g. car2car) where connected mobile small stations relay the backhaul link offered by a single or multiple relays in the mobile small station network. A relay is a mobile small station in a mobile small station network that is connected to the macro Station and provides a WAN connection to the moving small station network.

One problem addressed by various described examples includes efficiently guaranteeing seamless handovers of a moving small station network between macro cells making use of the geographical dimension of the mobile small station network to prevent degradation of communication in cell edge or other area of declining signal strength (in general, in critical coverage conditions of the macro cell layer). In various examples, the cell edge is tunneled between two macro cells by seamlessly handing over the connection from the mobile small station network to the operator's core network from a connected mobile small station. A macro station connection to a mobile small station may also be handed over to another mobile small station in the moving network, all while maintaining access links offered by the mobile small station network.

One or more advantages may be provided by various examples such as seamless handover, no degradation of connection quality offered to passengers in a cell edge of a macro cell, idle mode "paging" of mobile small stations in the mobile small station network via a connected mode mobile small station, efficient mobility solutions—also on NAS level, and SON feature of detection of collective mobility via collaboration of mobile small stations.

FIG. 1 is a block diagram illustration of a moving small station network 100. A train 110 is illustrated having at least two small cell stations 115 and 120 on board the train moving together. Small cell station 115 is positioned near the front of the train, while small cell station 120 is shown near the back of the train. Two macro base stations 125 and 130 are also illustrated and are situated along the path of the train, with macro base station 125 shown as encountered first by the train and connected to small cell station 120 to provide a WAN connection, and also connected to further cell stations 135 and 140 respectively represent a core network. Small cell station 120 serves as a relay for devices in the moving small cell network, relaying communications to small cell station 115. Each of the small cell stations may communicate with other devices in the small cell moving network.

Communications may start to degrade between small cell station 120 and macro base station 125 as the train 110 continues to move toward the edge of coverage of macro base station 125. Prior to significant degradation, small cell station 120 may come within range of macro base station 130. A handover is initiated, and small cell station 120 continues to serve as the relay, but provides the WAN connection via macro base station 130.

Figure 2:
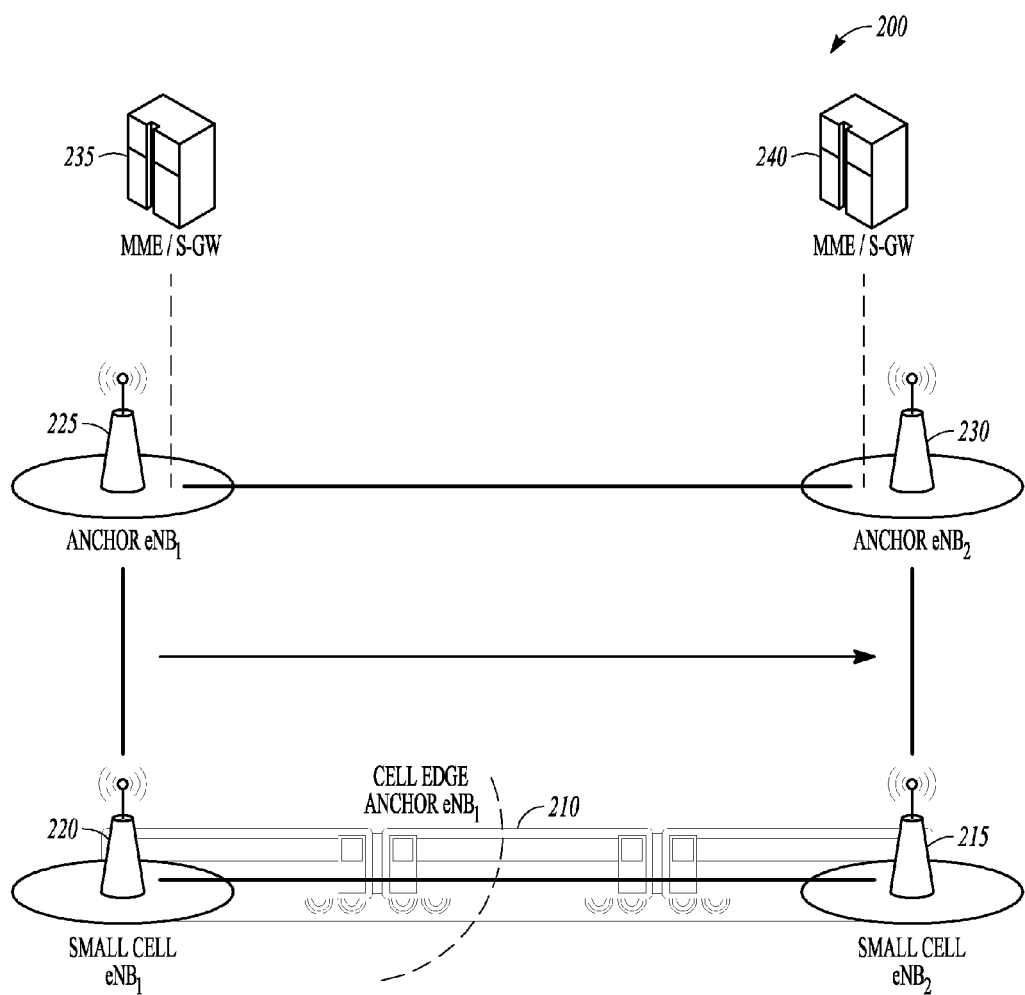
FIG. 2 is a block diagram of an alternative small station moving network according to an example embodiment.

FIG. 2 is a block diagram of a similar moving small cell network 200, again including a train 210, similarly situated small cell stations 215 and 220, fixed macro cell stations 225, 230, and further cell stations 235 and 240. In network 200, small cell station 220 initially acts as the relay in communication with macro cell station 225. Small cell station 220 also pages small cell station 215, and this time determines that a handover of the relay function to small cell station 215 is desired, along with a handover of WAN connectivity to macro station 230. The handovers may be performed seamlessly prior to communication degradation. As the train 210 continues to move, a handover back to small cell station 220 may occur resulting in small cell station 220 providing the relay function and communicating with macro station 230.

Figure 3:
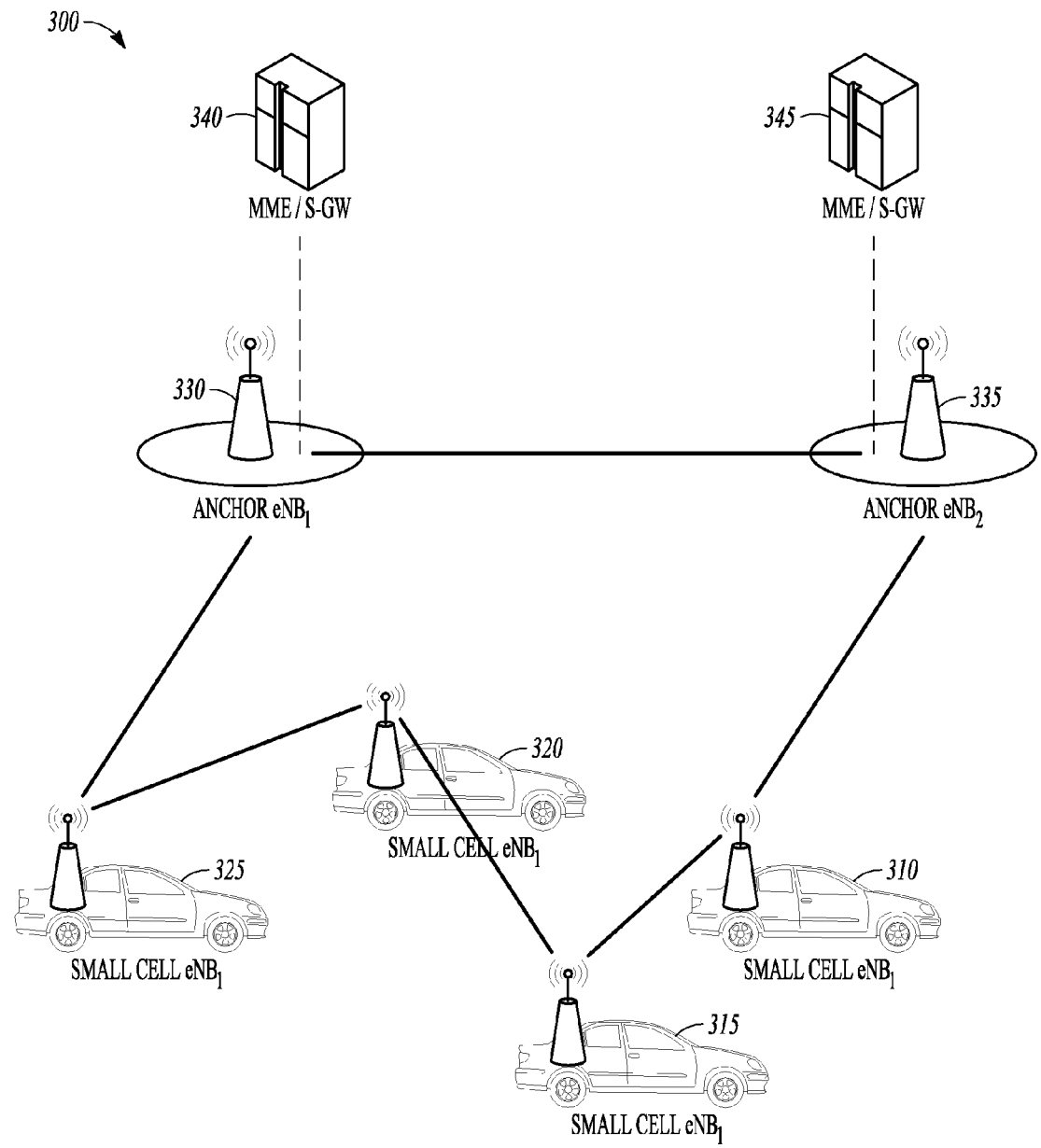
FIG. 3 is a block diagram of a further alternative small station moving network according to an example embodiment.

FIG. 3 is a representation of a further moving small cell network 300. Network 300 involves several cars, each having mobile small cell stations 310, 315, 320, and 325 in one example. Two fixed macro stations 330 and 335 are illustrated along with further cell stations 340 and 345. The cars are shown moving from macro station 330, shown connected to small cell station 325 toward macro station 335, which will likely connect with small cell station 310 at the front of the pack of cars. Multiple different handover scenarios may be performed as the cars move. The network membership may also be dynamic as cars move away from each other and as new cars come within range. Separate networks may be merged in further embodiments as they come together, and may later split apart as a group of faster cars moves away together.

Figure 4:
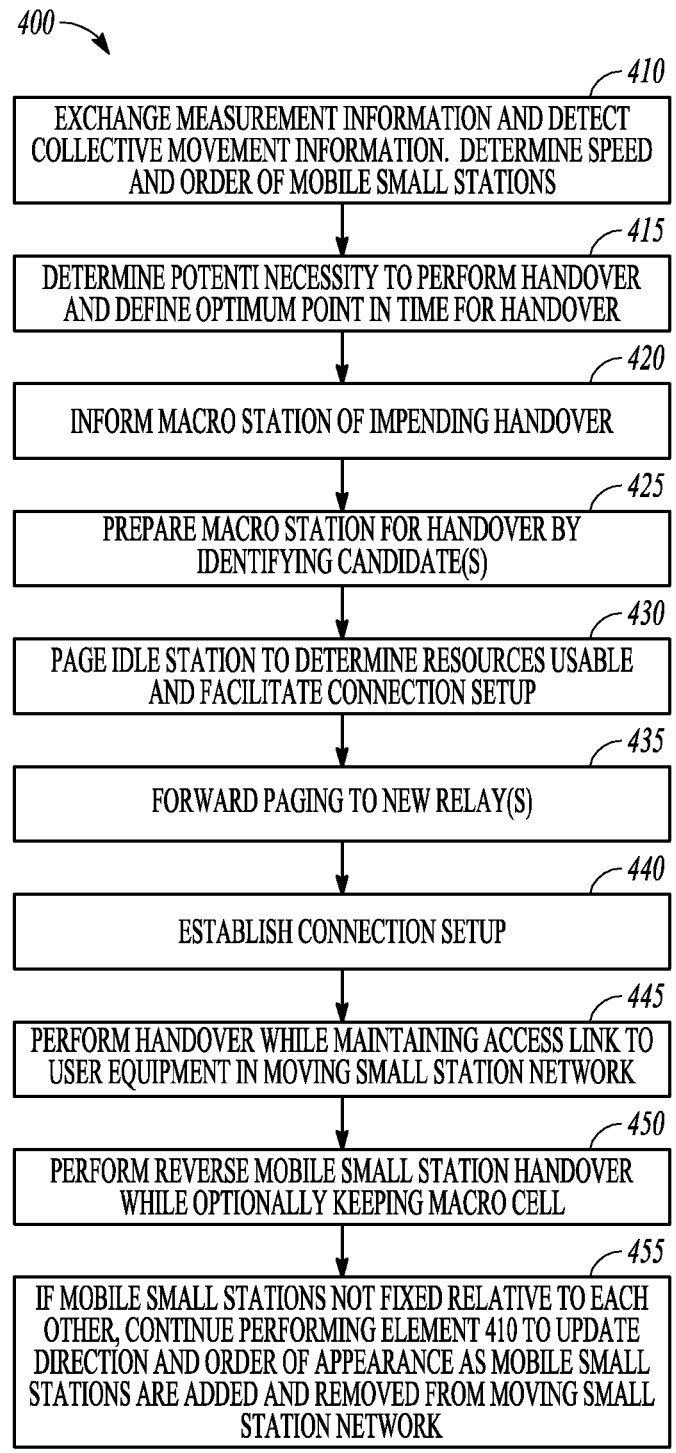
FIG. 4 is a flowchart illustrating a method of handover of relay responsibilities for a small station moving network according to an example embodiment.

Networks 100, 200, and 300 may use various strategies and techniques to determine desired hand over conditions. A method 400 of determining when and how to perform handovers is illustrated in flowchart form in FIG. 4. At 410, communications between the mobile small stations in the networks may include exchanging measurement information and applying pattern matching or similar techniques on measurements of fixed macro cells (e.g. measurements for idle mode cell selection) from different mobile small stations to detect collective movement, direction, current speed and order of appearance of mobile nested stations.

In other words, typical measurements like degrading one macro cell and increasing signal strength of another will occur in some mobile small stations earlier than in others, but all mobile small stations will see more or less the same measurement change over time. From comparing, the speed and also the order in which the mobile small stations move through the measured surroundings can be calculated. The measurements may be passed on to the macro station for performing the various functions described, performed at the current relay, or performed at each of the mobile small stations in various examples.

At 415, the measurements and additionally continuous measurements are used to detect potential necessity to perform handover (HO) and define the optimum point in time for such HO, which in general is different from the point in time the network would chose based on a single connected mode mobile station.

If the macro station did not make the calculations itself, it may be informed about the coming handover point at 420 by providing measurements that include in addition to state-of-the-art connected mode measurements from the current relay. Additionally, measurements of one or more idle mode mobile small stations that can potentially takeover the relaying function, the initially collected measurements, or alternatively or additionally, results of calculations in the mobile small station from the measurements of different relays may be provided.

In one example, a point in time for handover or a time period after which the current WAN connection, such as a radio resource connection (RCC), is expected to gain from HO may be provided. Still further, an ID of a single or multiple of the mobile small stations that may newly provide the relaying function after HO may be provided.

This information may be sent regularly or as requested by the network. Transmission should be based on an event, which could be that any of the relay reports signal strength of a macro station other than the currently connected to cross a threshold or similar.

In the network infrastructure (macro station) preparing HO of the moving small station network is done at 425 by preparing the target macro station to serve the identified (still idle RCC connection corresponding to a low power consumption mode) mobile small station to be the new relay. Instead of selecting only one device as a new relay in the moving small station network, the network infrastructure may also choose to generate a list of potential future relays including an order of precedence.

Paging the identified station may be performed at 430 from the network infrastructure via the (still connected—RCC connected mode) current relay. This paging of the idle station may include more information than the legacy paging, e.g. it may include resources usable by that station thus shortening the RRC Connection setup.

Forwarding the paging (including potentially added resource information) to the new relay(s) may then be performed at 435.

At 440, an RRC Connection Setup may be established by the identified new relay (potentially using the added resource information).

A handover of a backhaul part of the bearers may occur at 445 while the access link offered by the mobile small stations to user equipment remains in place.

A reverse handover from the new relay back to the old (or any other Relay in the "back" of the small cell network) may also occur at 455 while potentially keeping the macro cell (normal handover), thus extending the residence time of the moving small cell network in the macro cell.

Method 400 may provide one or more of an ability to forecast a handover between a relay and macro cell before signal degradation effects the relay. This is advantageous as it prevents many connected devices from experiencing typically data rate degradation at cell edges. The order of mobile small stations with respect to the direction of movement may be detected and used to forecast the handover between a relay and macro cell. Idle mode measurements may be performed by mobile small stations at surrounding macro cells which are reported to the relay node. Such measurements may be advantageous by increasing the reliability of the forecast.

By continuously utilizing measurements of moving small stations forming the cluster instead of only optimizing the connection of a single connected mode station until degrading connection quality, forces handover of the relaying function to another station, ensuring quality of service for all user equipment served by the moving small station network to be maintained on a high level.

Early handover may be achieved through a highly efficient mechanism that uses a still working connection to one moving small station to page a potential new relay, thus preventing resource demanding paging on the paging channel of the target cell. By preparing the handover well in advance, seamlessness may be assured. By preparing a group handover of mobile small stations, the network avoids measurements of all mobile small stations and avoids quality and capacity degrading measurement gap insertion in the mobile small stations.

Also, by providing a one-step handover mechanism from handing over the relaying function within the moving small station network and the macro station, drawbacks that come with a two-step approach, first handing over relay functionality while keeping the macro station and only then handing over the new relay between macro stations or vice-versa, are avoided.

The functions described may be executed by a single central function within the moving small station network, so that all devices deliver their measurement to that function, e.g. performed by the current relay in connected mode, or the function may be done decentralized, in each mobile small station or a subgroup of mobile small stations.

Figure 5:
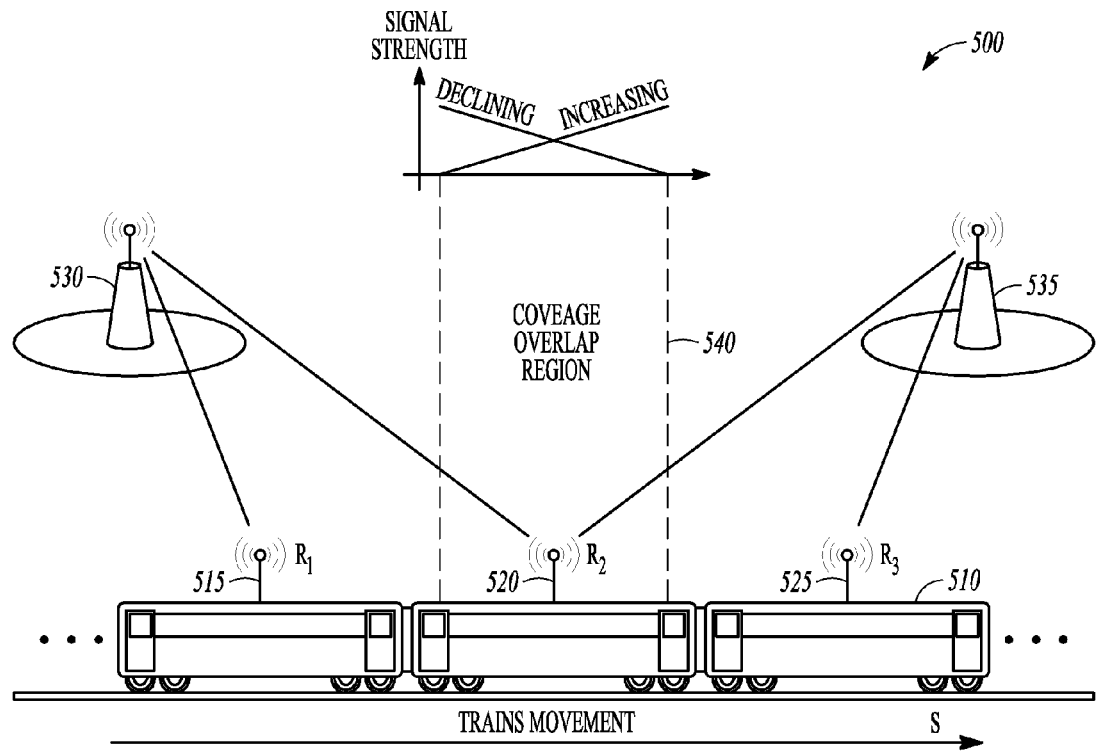
FIG. 5 is a block diagram of a small station moving network according to an example embodiment.

FIG. 5 illustrates an example of a network 500, and assumes a central function performed in a current relay. A train 510 is illustrated having three potential Relays 515, 520, and 525 ($R_1$, $R_2$ and $R_3$ respectively) that move collectively in train 510. Each of the potential relays 515, 520 and 525 are shown in a separate car. In further embodiments, a car may have more or fewer potential relays, and the train may have many more cars and hence likely many more potential relays connected together in a moving small cell network.

A backhaul connection is offered by either of two macro stations 530, 535 (Macro $eNB_{1,2}$). Both macro cells or stations 530 and 535 have an overlapping coverage area 540, in which a signal strength declines for moving small stations that are moving away from respective macro cells, and increases as such moving small stations move toward respective macro cell.

Figure 6:
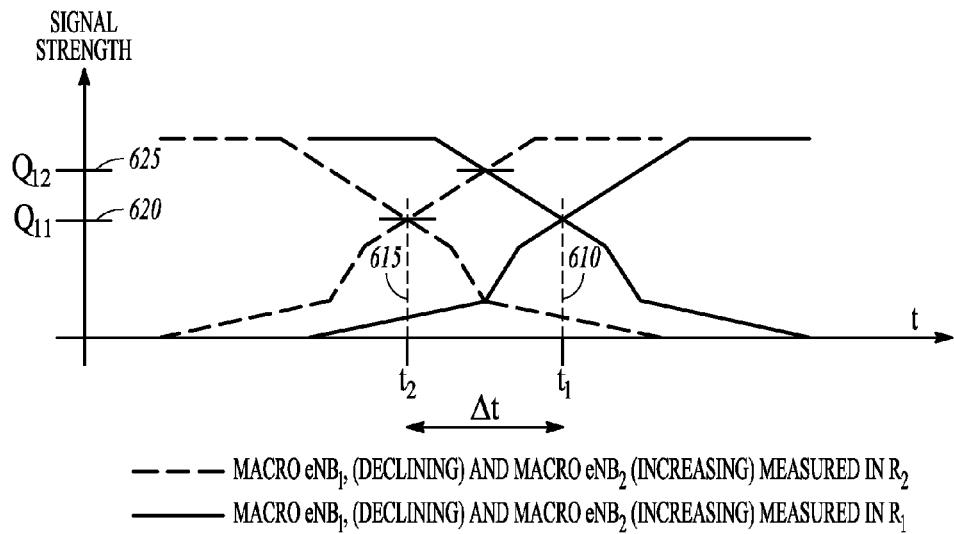
FIG. 6 is a graph illustrating signal strength for a small station moving network according to an example embodiment.

Measurements of the two macro cells in relays 515 $R_1$ and 520 $R_2$ are shown in FIG. 6 generally at 600. $t_1$ at 610 depicts an arbitrary time instance of measurements in relay 515 $R_1$ (in this case the point in time when Macro eNB2 at 535 is received with higher signal strength than $eNB_1$) and $t_2$ at 615 depicts the same measurements situation in relay 520 $R_2$ occurring by $\Delta t$ earlier. $Q_{11}$ at 620 represents the signal strength at the point in time when $eNB_2$ becomes better than $eNB_1$ which would lead to a handover by $R_1$ between $eNB_1$ 530 and eNB2 535 (a hysteresis is not assumed for the sake of simplicity), whereas $Q_{12}$ at 625 represents the signal strength at the point in time when $eNB_2$ 535 becomes better in $R_2$ 520 than $eNB_1$ 530 in $R_1$ 515 which in one example leads to a handover.

Figure 7:
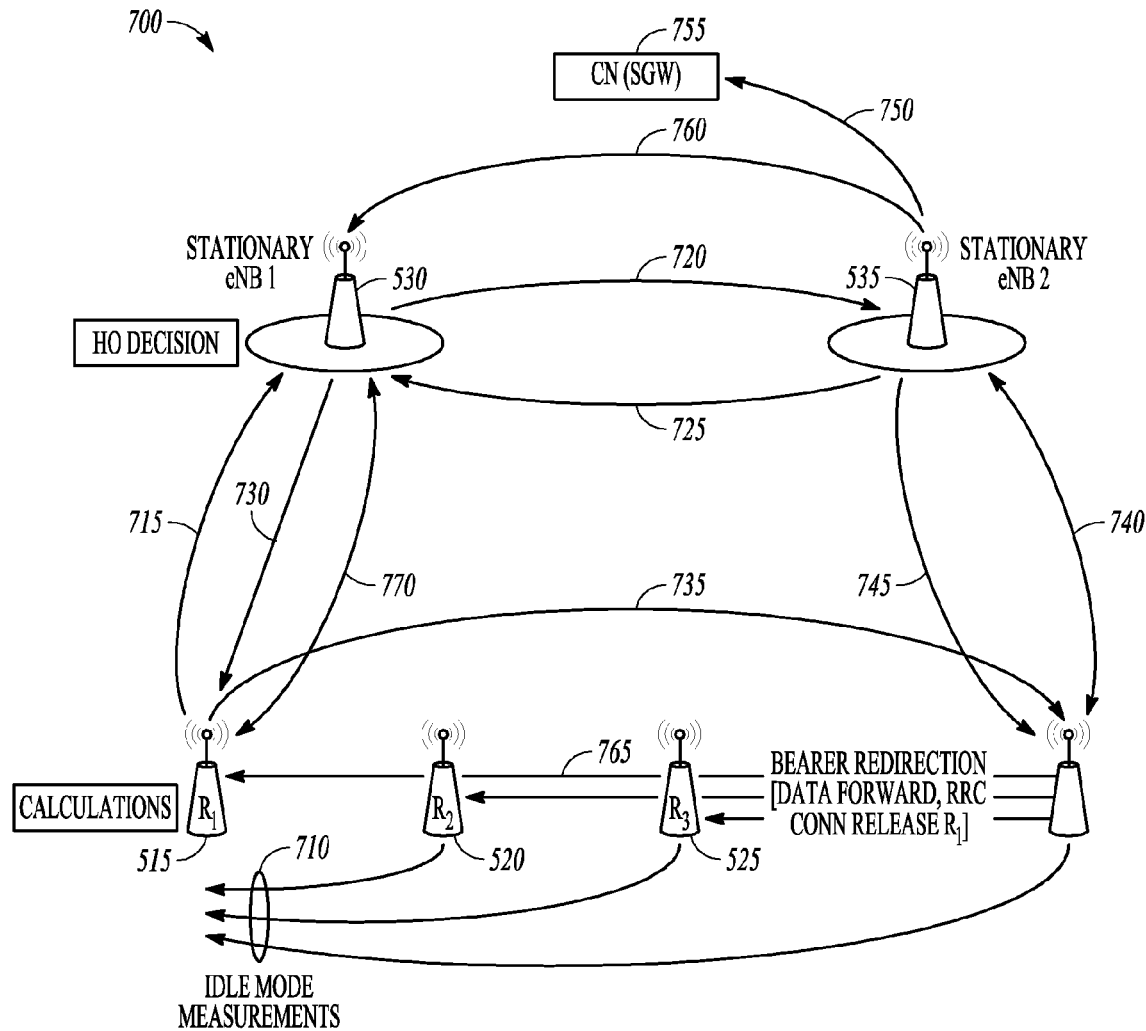
FIG. 7 is a block flow diagram of a small station moving network according to an example embodiment.

FIG. 7 is a diagram illustrating a method 700 of handovers in the network 500. Reference numbers identifying mobile small stations 515, 520, 525 and macro stations 530 and 535 is consistent with that in FIG. 5. Idle mode measurements from the mobile small stations 515, 520, 525 are shown being received at 710 by a current relay, small station 515. The measurements may include detection of collective movement and a handover decision.

As evident from FIG. 6, different relay stations in the train will measure very similar signal strength of different macro stations but will experience a time delay between similar measurements that depends on the speed of the train and the distance between the Relays. The measurements are not exactly the same due to differences in the felay setup (antennas, carriages) as well as time varying channels, however, intelligent pattern matching algorithms will be able to detect similarities and derive for example the following parameters.

In one example, small station 515 will perform many calculations, including order of appearance along the route of train movement (which relay detects signals first, next, . . . last), speed (exact if distance of the small stations is known, otherwise relative between consecutive measurement circle), and $\Delta t$ as depicted in FIG. 6, that is the expected time difference between similar measurement scenarios. Different relays may provide their idle mode measurements to the current connected mode relay, small station 515, which will send measurement reports to its macro station 530 ($eNB_1$) at 715 that newly include the Idle mode measurements of $R_{2...n}$ (may be filtered).

In one example $eNB_1$ 530 performs calculations which result in derivation of the above parameters and criteria for handover. Degrading signal strength of $eNB_1$ 530 measured in $R_2$ 520 currently will be a sign of reduced QoS available in $R_1$ 515 to be expected with a delay of $\Delta t$. If, as in FIG. 7, the signal strength of another Macro Station ($eNB_2$ 535) becomes clearly better in $R_2$, a handover can be decided in the $eNB_1$ 530. The advantage is also evident from FIG. 7: An earlier handover is possible while keeping the connection quality (represented by the rx signal strength $Q_{12}$ 625) at a higher level compared with $Q_{11}$ 620 at the legacy handover point t1 640).

Alternatively the calculation could also be done in $R_1$ 515, and the result could be reported to macro station 530 in a measurement report. The new measurement report, containing raw measurements from various idle mode relays $R_n$ or calculation results of $R_1$, may in addition contain identifiers of Relay stations $R_n$ so that a handover initiation by $eNB_1$ 530 can be efficiently directed towards the appropriate relay.

HO preparation and "Paging" may occur at 720, where macro station 530 pages macro station 535, which responds at 725 confirming and providing an indication of resources available. With the reported parameters from $R_1$ the network can decide on a handover. To prepare handover execution, $eNB_1$ will request handover by informing $eNB_2$ at 720. $eNB_2$ 535 may respond with appropriate additional information that accelerates small station 520, $R_2$'s, connection setup with $eNB_2$, 535. For example, resources for access (RACH resource, Bearer Setup, etc. may be provided at 725.

The handover decision together with this resource information will be sent at 730 by $eNB_1$ to $R_2$ via $R_1$. The reception of the information will trigger $R_2$ to start an RRC connection setup procedure. In essence, $R_2$ has been paged, but without using the expensive paging resources by $eNB_2$.

$R_1$, while forwarding the paging message at 735, will itself prepare handover of the relay functionality within the moving small station network, e.g. it will perform data forwarding to the new relay $R_2$ and release its own backhaul connection.

$R_2$ and $eNB_2$ will setup an RRC connection as indicated at 740 and if required configure appropriate bearers at 745 so that $R_2$ is fully enabled to provide the WAN connection for the moving small cell network. After that, $eNB_2$ will inform the core network about successful handover preparation at 750. Bearer routing may now be switched in the core network (SGW) 755 towards $eNB_2$ and $eNB_1$ may be requested to forward any not yet successfully transmitted data at 760. Similarly $R_2$ may inform $R_1$ and other relays that redirect their backhaul connection towards $R_4$ at 765 and data forwarding may take place between $R_1$ and $R_2$. Now, the RRC Connection between $R_1$ and $eNB_1$ may be released at 770.

In principle, after RRC connection setup between $eNB_2$ and $R_2$, no further direct data exchange between $eNB_1$ and $R_1$ is required which is especially advantageous as that degrading radio link can be replaced by a the new radio link $eNB_2$-$R_2$ in conjunction with data forwarding between $R_1$ and $R_2$ and between $eNB_2$ and $eNB_1$, respectively.

Very similar to the above method, a reverse handover can be performed. Once it is detected that a macro cell ($eNB_2$) degrades for a front relay ($R_2$) while a new macro cell ($eNB_3$) is still not well received and while the same macro cell ($eNB_2$) still has good quality for a back relay ($R_1$) a handover can be initiated at low costs (no paging by simple forwarding paging messaging via $R_2$) and a handover back to $R_2$ in the new cell ($eNB_3$) in the same manner as above once the front relay has fully entered the new macro cell spanned by $eNB_3$.

Method 700 is described utilizing a fixed relationship between relay nodes. A more dynamic, yet valid scenario is an ad hoc short term connection between potential relay nodes for the purpose to collectively use the available WAN resources more efficiently as described with respect to moving small cell network 300 involving automobiles.

To handle such a network involving ad hoc short term connections, the relay nodes perform an additional task, which is to detect the ability to efficiently share the WAN resource. This includes detecting those relay nodes that have a common direction and similar average speed, so that at least for a significant period of time the ad hoc network will stay intact and sharing a WAN connection makes sense for all participating relays.

This detection can be done in either of the relay nodes, or collectively, by utilizing positioning methods to derive geographical information and/or radio measurements to derive similar measurement curves over a period of time. The information can lead to a group of moving small cells to build an ad hoc network (e.g. via WiFi or WiGig or generally mmWave technologies) and define the group's front-most and back-most device (or the order of appearance in the sense of moving direction) to perform method 700. One difference as compared to the fixed scenario is that the members of the ad hoc group may regularly change and even with unchanged members the order of appearance may have to be updated regularly.

Figure 8:
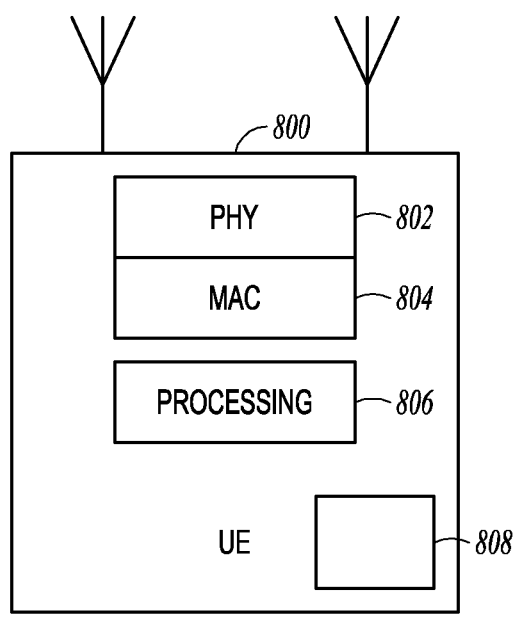
FIG. 8 is a block diagram of an example cell station according to an example embodiment.

FIG. 8 is a block diagram of a specifically programmed computer system to act as one or more different types of cell stations, including user equipment, small cell stations and macro stations. The system may be used to implement one or more methods according to the examples described. In the embodiment shown in FIG. 8, a hardware and operating environment is provided to enable the computer system to execute one or more methods and functions that are described herein. In some embodiments, the system may be a small cell station, macro cell station, smart phone, tablet, or other networked device that can provide access and wireless networking capabilities to one or more devices. Such devices need not have all the components included in FIG. 8.

FIG. 8 illustrates a functional block diagram of a cell station 800 in accordance with some embodiments. Cell station 800 may be suitable for use as a small cell station, macro cell station, or user equipment, such as a wireless cell phone, tablet or other computer. The cell station 800 may include physical layer circuitry 802 for transmitting and receiving signals to and from eNBs using one or more antennas 801. Cell station 800 may also include processing circuitry 804 that may include, among other things a channel estimator. Cell station 800 may also include memory 806. The processing circuitry may be configured to determine several different feedback values discussed below for transmission to the eNB. The processing circuitry may also include a media access control (MAC) layer.

In some embodiments, the cell station 800 may include one or more of a keyboard, a display, a non-volatile memory port, multiple antennas, a graphics processor, an application processor, speakers, and other mobile device elements. The display may be an LCD screen including a touch screen.

The one or more antennas 801 utilized by the cell station 800 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $\frac{1}{10}$ of a wavelength or more.

Although the cell station 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the cell station 800 may be configured with the instructions to perform the operations described herein.

In some embodiments, the cell station 800 may be configured to receive OFDM communication signals over a multi-carrier communication channel in accordance with an OFDMA communication technique. The OFDM signals may comprise a plurality of orthogonal subcarriers. In some broadband multicarrier embodiments, evolved node Bs (NBs) may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the cell station 800 and the eNBs may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, December 2010, including variations and evolutions thereof.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier x one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs. In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the cell station 800 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the cell station 800 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the cell station 800 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the cell station and reported to the eNB. In some embodiments, the cell station may transmit a physical uplink control channel (PUCCH) of format 2, 2a or 2b containing the CQI/PMI or RI.

In these embodiments, the CQI may be an indication of the downlink mobile radio channel quality as experienced by the cell station 800. The CQI allows the cell station 800 to propose to an eNB an optimum modulation scheme and coding rate to use for a given radio link quality so that the resulting transport block error rate would not exceed a certain value, such as 10%. In some embodiments, the cell station may report a wideband CQI value which refers to the channel quality of the system bandwidth. The cell station may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a cell station in which two or more cooperating/coordinating points, such as remote-radio heads (RRHs) transmit jointly. In these embodiments, the joint transmissions may be MIMO transmissions and the cooperating points are configured to perform joint beamforming.

LTE Channel Estimation

To facilitate the estimation of the channel characteristics LTE uses cell specific reference signals (i.e., pilot symbols) inserted in both time and frequency. These pilot symbols provide an estimate of the channel at given locations within a subframe. Through interpolation it is possible to estimate the channel across an arbitrary number of subframes. The pilot symbols in LTE are assigned positions within a subframe depending on the eNodeB cell identification number and which transmit antenna is being used, as shown in the figure below. The unique positioning of the pilots ensures that they do not interfere with one another and can be used to provide a reliable estimate of the complex gains imparted onto each resource element within the transmitted grid by the propagation channel.

To minimize the effects of noise on the pilot estimates, the least square estimates are averaged using an averaging window. This simple method produces a substantial reduction in the level of noise found on the pilots. There are two pilot symbol averaging methods available.

Time averaging is performed across each pilot symbol carrying subcarrier, resulting in a column vector containing an average amplitude and phase for each reference signal carrying subcarrier.

All the pilot symbols found in a subcarrier are time averaged across all OFDM symbols, resulting in a column vector containing the average for each reference signal subcarrier, The averages of the pilot symbol subcarriers are then frequency averaged using a moving window of maximum size.

In some embodiments, The PSS and SSS provide the cell station with its physical layer identity within the cell. The signals may also provide frequency and time synchronization within the cell. The PSS may be constructed from Zadoff-Chu (ZC) sequences and the length of the sequence may be predetermined (e.g., 62) in the frequency domain. The SSS uses two interleaved sequences (i.e., maximum length sequences (MLS), SRGsequences or m-sequences) which are of a predetermined length (e.g., 31). The SSS may be scrambled with the PSS sequences that determine physical layer ID. One purpose of the SSS is to provide the cell station with information about the cell ID, frame timing properties and the cyclic prefix (CP) length. The cell station may also be informed whether to use TDD or FD. In FDD, the PSS may be located in the last OFDM symbol in first and eleventh slot of the frame, followed by the SSS in the next symbol. In TDD, the PSS may be sent in the third symbol of the 3rd and 13th slots while SSS may be transmitted three symbols earlier. The PSS provided the cell station with information about to which of the three groups of physical layers the cell belongs to (3 groups of 168 physical layers). One of 168 SSS sequences may be decoded right after PSS and defines the cell group identity directly.

In some embodiments, the cell station may be configured in one of 8 "transmission modes" for PDSCH reception: Mode 1: Single antenna port, port 0; Mode 2: Transmit diversity; Mode 3: Large-delay CDD; Mode 4: Closed-loop spatial multiplexing; Mode 5: MU-MIMO; Mode 6: Closed-loop spatial multiplexing, single layer; Mode 7: Single antenna port, cell station-specific RS (port 5); Mode 8 (new in Rel-9): Single or dual-layer transmission with cell station-specific RS (ports 7 and/or 8). The CSI-RS are used by the cell station for channel estimates (i.e., CQI measurements). In some embodiments, the CSI-RS are transmitted periodically in particular antenna ports (up to eight transmit antenna ports) at different subcarrier frequencies (assigned to the cell station) for use in estimating a MIMO channel. In some embodiments, a cell station-specific demodulation reference signal (e.g., a DM-RS) may be precoded in the same way as the data when non-codebook-based precoding is applied.

EXAMPLES

1. An example mobile small station comprising:
a transceiver;
a processor; and
a memory having instructions for execution by the processor to:
  exchange measurement information with a macro station;
  provide a wide area network connection and act as a relay for a small station moving network with the mobile small station; and
  perform handover of relay responsibilities to another mobile small station in the small station moving network.

2. The example mobile small station of example 1 wherein the handover of relay responsibilities is performed before signal degradation adversely affects the relay.

3. The example mobile small station of example 1 wherein the measurement information is also exchanged with other mobile small stations in the small station moving network.

4. The example mobile small station of example 3 wherein the measurement information comprises signal strength over time.

5. The example mobile small station of example 4 wherein the instructions further cause the processor to compare exchanged measurement information to determine a speed of the mobile small station moving network and an order of small station moving network.

6. The example mobile small station of example 5 wherein the instructions further cause the processor to:
  detect a potential necessity to perform a handover; and
  define an optimum point in time for the handover.

7. The example mobile small station of example 6 wherein the optimum point in time for the handover is defined as a point in time when a signal from a current relay is decreasing while a signal from a potential new relay is increasing, and such signals are approximately equal and providing a an acceptable quality of service.

8. The example mobile small station of example 6 wherein the instructions further cause the processor to identify a mobile small station to act as a relay for the small station moving network.

9. The example mobile small station of example 8 wherein the instruction further cause the processor to page the identified mobile small station via the small station moving network to obtain information about resources available in the identified mobile small station usable to shorten radio resource control (RRC) connection setup with the identified mobile small station act as a new relay for the small station moving network.

10. The example mobile small station of example 1 wherein the mobile small station is coupled to the small station moving network via a wire.

11. The example mobile small station of example 1 wherein the mobile small station is coupled to the small station moving network wirelessly.

12. An example method comprising:
  exchanging, via a mobile small station, measurement information with a macro station;
  providing a wide area network connection and acting as a relay for a small station moving network with the mobile small station; and
  performing a handover of relay responsibilities to another mobile small station in the small station moving network.

13. The example method of example 12 wherein the handover of relay responsibilities is performed before signal degradation adversely affects the relay.

14. The example method of example 12 wherein the measurement information is also exchanged with other mobile small stations in the small station moving network.

15. The example method of example 14 wherein the measurement information comprises signal strength over time, and wherein the instructions further cause the processor to compare exchanged measurement information to determine a speed of the mobile small station moving network and an order of small station moving network.

16. The example method of example 15 and further comprising:
  detecting a potential necessity to perform a handover; and
  defining an optimum point in time for the handover, wherein the optimum point in time for the handover is defined as a point in time when a signal from a current relay is decreasing while a signal from a potential new relay is increasing, and such signals are approximately equal and providing a an acceptable quality of service.

17. An example macro station comprising:
a transceiver;
a processor; and
a memory having instructions for execution by the processor to:
receive measurement information with a mobile small station moving with a small station moving network and serving as a relay for the network;
provide a wide area network connection to the mobile small station acting as the relay; and
perform handovers of the relay responsibilities.

18. The example macro station of example 17 wherein the handover is performed between two mobile small stations in the small station moving network.

19. The example macro station of example 17 wherein the handover is performed between two macro stations communicating with the same mobile small station acting as the relay in the small station moving network.

20. The example macro station of example 17 wherein the handover is performed between two macro stations and two mobile small stations such that a different mobile small station acts as a new relay for the small station moving network communicating with a different macro station.

21. An example base station comprising:
a transceiver;
a processor coupled to the transceiver; and
a memory having instructions that cause the processor to execute the instructions to:
communicate with a first mobile small station acting as a relay to relay communications to multiple mobile small stations in a moving small station network;
receive an identification of a second mobile small station in the moving small station network to act as a new relay; and
switch communications from the first mobile small station to the second mobile small station to act as the relay for the multiple mobile small stations in the moving small station network.

22. The example base station of example 21 wherein the instructions further cause the processor to receive measured information wherein the measurement information comprises signal strength over time.

23. The example base station of example 22 wherein the instructions further cause the processor to compare exchanged measurement information to determine a speed of the small station moving network and an order of small station moving network.

24. The example base station of example 23 wherein the speed and order are determined by pattern matching and comparing patterns from multiple mobile small stations in the small station moving network.

25. An example method comprising:
providing a wide area network connection via a mobile small station to act as a relay for a small station moving network;
obtaining measurement information from mobile small stations in the small station moving network; and
handing over relay responsibilities to another mobile small station in the small station moving network.

27. The example method of example 25 wherein handing over relay responsibilities is performed before signal degradation adversely affects relay performance.

28. The example method of example 25 wherein the measurement information is also exchanged with other mobile small stations in the small station moving network, and wherein the measurement information comprises signal strength over time.

29. The example method of example 28 and further comprising comparing exchanged measurement information from multiple mobile small stations to determine a speed of the mobile small stations moving network and an order of the mobile small stations in the small station moving network.

30. The example method of example 29 and further comprising:
detecting a potential necessity to perform a hand over; and
defining an optimum point in time for the handover.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A mobile small station comprising:
a transceiver;
a processor; and
a memory having instructions for execution by the processor to:
provide a wide area network connection and act as a relay for a small station moving network of member mobile small stations, the member mobile small stations including the mobile small station and other mobile small stations;
exchange measurement information with a macro station and the other mobile small stations in the small station moving network, the measurement information exchanged with the other mobile small stations including signal strength to the macro station of the mobile small station and the other mobile small stations;
compare exchanged signal strength measurement information over time to determine a collective speed and direction of the mobile small station moving network members and a precedence order for the small station moving network members, the precedence order being the order in which the mobile small station moving network members are moving;
identify a subset of small station moving network members that have precedence ordering, speed, and direction compatible with shared use of the wide area network connection, the precedence ordering, speed, and direction determined from the exchanged signal strength measurement information; and
perform handover of relay responsibilities to a second mobile small station in the subset of small station moving network members, the second mobile small station selected based on the precedence ordering.

2. The mobile small station of claim 1 wherein the handover of relay responsibilities is performed before signal degradation adversely affects the relay.

3. The mobile small station of claim 1 wherein the instructions further cause the processor to:
detect a potential necessity to perform a handover; and
define an optimum point in time for the handover.

4. The mobile small station of claim 3 wherein the optimum point in time for the handover is defined as a point in time when a signal from a current relay is decreasing while a signal from a potential new relay is increasing, and such signals are equal and providing an acceptable quality of service, a potential new relay being a member of the subset of small station moving network members.

5. The mobile small station of claim 1 wherein the instruction further cause the processor to page the second mobile small station via the small station moving network to obtain information about resources available in the second mobile small station usable to shorten radio resource control (RRC) connection setup when the second mobile small station acts as a new relay for the small station moving network.

6. The mobile small station of claim 1 wherein the mobile small station is coupled to the small station moving network via a wire.

7. The mobile small station of claim 1 wherein the mobile small station is coupled to the small station moving network wirelessly.

8. A method performed by a mobile small station, the method comprising:
provide a wide area network connection and acting as a relay for a small station moving network of member mobile small stations, the member mobile small stations including the mobile small station and other mobile small stations;
exchanging measurement information with a macro station and the other mobile small stations in the small station moving network, the measurement information exchanged with the other mobile small stations including signal strength to the macro station of the mobile small station and the other mobile small stations;
comparing exchanged signal strength measurement information over time to determine a collective speed and direction of the mobile small station moving network members and a precedence order for the small station moving network members, the precedence order being the order in which the mobile small station moving network members are moving;
identifying a subset of small station moving network members that have precedence ordering, speed, and direction compatible with shared use of the wide area network connection, the precedence ordering, speed, and direction determined from the exchanged signal strength measurement information; and
performing a handover of relay responsibilities to a second mobile small station in the subset of small station moving network, the second mobile small station selected based on the precedence ordering.

9. The method of claim 8 wherein the handover of relay responsibilities is performed before signal degradation adversely affects the relay.

10. The method of claim 8 and further comprising:
detecting a potential necessity to perform a handover; and
defining an optimum point in time for the handover, wherein the optimum point in time for the handover is defined as a point in time when a signal from a current relay is decreasing while a signal from a potential new relay is increasing, and such signals are approximately equal and providing an acceptable quality of service.

11. The method of claim 8 further comprising paging the second mobile small station via the small station moving network to obtain information about resources available in the second mobile small station usable to shorten radio resource control (RRC) connection setup when the second mobile small station acts as a new relay for the small station moving network.

12. At least one non-transitory machine readable medium including instructions that, when executed by a machine, configure the machine to:
provide a wide area network connection and acting as a relay for a small station moving network of member mobile small stations, the member mobile small stations including the mobile small station and other mobile small stations;
exchange measurement information with a macro station and the other mobile small stations in the small station moving network, the measurement information exchanged with the other mobile small stations including signal strength to the macro station of the mobile small station and the other mobile small stations;
compare exchanged signal strength measurement information over time to determine a collective speed and direction of the mobile small station moving network members and a precedence order for the small station moving network members, the precedence order being the order in which the mobile small station moving network members are moving;
identify a subset of small station moving network members that have precedence ordering, speed, and direction compatible with shared use of the wide area network connection, the precedence ordering, speed, and direction determined from the exchanged signal strength measurement information; and
perform a handover of relay responsibilities to a second mobile small station in the subset of small station moving network, the second mobile small station selected based on the precedence ordering.

13. The at least one machine readable medium of claim 12 wherein the instructions configure the machine to perform handover of relay responsibilities before signal degradation adversely affects the relay.

14. The at least one machine readable medium of claim 12 wherein the instructions configure the machine to:
detect a potential necessity to perform a handover; and
define an optimum point in time for the handover, wherein the optimum point in time for the handover is defined as a point in time when a signal from a current relay is decreasing while a signal from a potential new relay is increasing, and such signals are approximately equal and providing a an acceptable quality of service.

15. The at least one machine readable medium of claim 12 wherein the instructions configure the machine to page the second mobile small station via the small station moving network to obtain information about resources available in the second mobile small station usable to shorten radio resource control (RRC) connection setup when the second mobile small station acts as a new relay for the small station moving network.

\* \* \* \* \*